US010025726B2

(12) United States Patent
Sibert et al.

(10) Patent No.: US 10,025,726 B2
(45) Date of Patent: Jul. 17, 2018

(54) METHOD IN A MEMORY MANAGEMENT UNIT FOR MANAGING ADDRESS TRANSLATIONS IN TWO STAGES

(71) Applicant: STMicroelectronics International N.V., Amsterdam (NL)

(72) Inventors: Herve Sibert, Le Mans (FR); Loic Pallardy, Rouillon (FR)

(73) Assignee: STMicroelectronics International N.V., Schiphol (NL)

( * ) Notice: Subject to any disclaimer, the term of this patent is extended or adjusted under 35 U.S.C. 154(b) by 279 days.

(21) Appl. No.: 14/526,686

(22) Filed: Oct. 29, 2014

(65) Prior Publication Data

US 2015/0143072 A1 May 21, 2015

(30) Foreign Application Priority Data

Nov. 15, 2013 (EP) .................................... 13193187

(51) Int. Cl.
*G06F 12/00* (2006.01)
*G06F 12/1036* (2016.01)
*G06F 12/1009* (2016.01)

(52) U.S. Cl.
CPC ...... *G06F 12/1036* (2013.01); *G06F 12/1009* (2013.01); *G06F 2212/657* (2013.01)

(58) Field of Classification Search
CPC ............. G06F 12/1036; G06F 12/1009; G06F 2212/657
See application file for complete search history.

(56) References Cited

U.S. PATENT DOCUMENTS

2009/0292899 A1* 11/2009 Mansell ............. G06F 12/1009
711/207
2012/0131306 A1* 5/2012 Bratt .................... G06F 12/1027
711/205

* cited by examiner

*Primary Examiner* — Gurtej Bansal
(74) *Attorney, Agent, or Firm* — Crowe & Dunlevy

(57) ABSTRACT

A memory management unit (MMU) may manage address translations. The MMU may obtain a first intermediate physical address (IPA) based on a first virtual address (VA) relating to a first memory access request. The MMU may identify, based on the first IPA, a first memory page entry in a second address translation table. The MMU may store, in a second cache memory, a first IPA-to-PA translation based on the identified first memory page entry. The MMU may store, in the second cache memory and in response to the identification of the first memory page entry, one or more additional IPA-to-PA translations that are based on corresponding one or more additional memory page entries in the second address translation table. The one or more additional memory page entries may be contiguous to the first memory page entry.

20 Claims, 10 Drawing Sheets

MEMORY PAGE ENTRY

METHOD IN A MEMORY MANAGEMENT UNIT FOR MANAGING ADDRESS TRANSLATIONS IN TWO STAGES

RELATED APPLICATION

This application claims the benefit of European Patent Application No. 13193187.5, filed Nov. 15, 2013, the contents of which are hereby incorporated by reference to the maximum extent allowable under law.

TECHNICAL FIELD

This disclosure relates to the field of memory management in electronic devices, and in particular, relates to a memory management unit for managing address translations.

BACKGROUND

A Memory Management Unit (MMU) may refer to a hardware block that translates virtual addresses of memory seen by a central processing unit (CPU) into physical addresses of volatile memory. A MMU typically has the following purposes.

When an operating system (OS) has two levels of privileges, such as a privileged level and a user level, the MMU may be reconfigured by the OS kernel, which may be running in privileged mode, when switching from one user process to another. This enables the providing of fully virtual memory maps to user processes, so that different user processes may see the same libraries of functions at different virtual addresses, and also so that user processes may see a limited part of memory, and may not be able to see the OS kernel data or code, or the data or code of other processes. This purpose of a MMU may thus be oriented towards security.

In addition, OS applications may include the allocation of big memory buffers for application processing. As memory allocation and de-allocation operations may occur often in an OS, the occupation of memory by the OS may quickly reach a fragmented state, in which there are many allocated memory chunks of various sizes, separated by many non-allocated chunks. In this situation, if the OS was working with physical memory, it might soon after startup be unable to allocate big contiguous buffers. The MMU may allocate a large virtual contiguous memory buffer to an OS application, but that memory buffer may in fact span several small chunks in physical memory. The MMU may manage translation of virtual contiguous addresses of the memory buffer into addresses of sparsely located chunks in physical memory. This purpose of a MMU may thus be oriented towards addressing the issue of fragmentation memory by hiding it.

To summarize, an MMU may translate virtual addresses (VA) in a VA space into physical addresses (PA) in a PA space, with a twofold goal of being able to provide contiguous memory buffers to applications running on the OS, and being able to isolate VAs seen by different applications running on the OS.

The VA memory is split into memory pages, for which there are different possible granularities, such as a memory page of small size such as 4 KB and a memory page of a larger size, such as 1 MB. For each page, access rights and information for how the page translates, i.e. maps, to PA are defined. This information for each page is gathered inside a MMU table in the form of a respective memory page entry that also may be referred to as a page descriptor, or page table entry (PTE), depending on terminology used.

FIG. 1A schematically illustrates an example of such a memory page entry. In the shown example, there is included a VA start address, a memory page size, an offset relative to a base address of the PA, and access rights. The MMU table is stored in memory, which can be volatile, such as random access memory (RAM), or non-volatile, such as read only memory (ROM), depending on whether the MMU table is to be modified dynamically during execution. If the access rights and translation are the same for large pages as for the small pages it contains, the MMU table may not contain memory page entries for the small pages, and it may instead contain an entry for the large page.

FIG. 1B schematically illustrates the principle of MMU address translations. Note that there are two addresses VA#1 that belong to different processes, such as different applications, running on the OS, but that map to different PAs, here PA#1 and PA#2 respectively. In practice it may be the OS that, based on which process is making a request for memory access, controls the MMU so as to use correct translations for that process, and the MMU may help ensure that different processes map to different PAs.

FIG. 1C schematically illustrates, in a simplified manner, a one-stage MMU 100, i.e. a MMU that uses one stage of address translation as described above. The one-stage MMU 100 is associated with, and has access to, a MMU table 102, such as described above. However, note that depending on implementation, the MMU table 102 may be physically located in memory outside the one-stage MMU 100. The one-stage MMU is associated with, and has access, to a cache memory 104, i.e. a fast access memory, associated with the MMU table 102, that is for storing memory page entries of the MMU table so as to enable quicker access by the MMU 100 than from the MMU table 102. For example, VAs likely to be requested next may be estimated, and memory page entries thereof may be put in the cache memory 104 to be accessible, if there is a later, i.e. further, request relating to a VA that is included in any of the memory page entries in the cache memory. A so called translation lookaside buffer (TLB) is an example of such memory cache of the MMU 100.

With the latest generations of processors, two-stage MMUs have been introduced. The purpose of a two-stage MMU is to be able to support multiple OSes running in parallel on the same hardware, which may be referred to as virtualization or isolation, in a way such that each OS has the impression of managing its own physical memory, peripherals and registers. Each such OS may be referred to as a guest OS. Each guest OS manages a contiguous intermediate physical address (IPA) space, which it may see as its own PA space, and, as before, uses VAs for applications running on the OS.

Hence each guest OS may use a first MMU stage that relates to VA-to-IPA translations, and that is similar to the stage in a conventional one-stage MMU that relates to VA-to-PA translations as described above. In order to manage the multiple OSes in parallel, each IPA may be remapped to a respective PA of physical memory, typically RAM. The VA-to-IPA stage may be controlled by the respective guest OS, while the IPA-to-PA stage may be controlled by what is referred to as a virtualization layer, or hypervisor, that is common for the Guest OSes running in parallel on the same hardware. A virtualization layer, or hypervisor, is an independent binary, running in a privileged mode, and manages memory and peripheral access rights for the guest OSes. The role is to mask the existence of multiple OSes and therefore their presence to each other. The hypervisor layer may be started before the guest OSs by a platform boot loader.

FIG. 2 schematically illustrates the principle of two-stage address translations in a two-stage MMU. Two guest OSes, guest $OS_X$ and guest $OS_Y$ are shown to illustrate the principle. Compare, for example, with the one stage address translations schematically illustrated in FIG. 1b. When a process, such as an application running on one guest OS, say guest $OS_X$, requests a VA, say $VA_X\#1$, the page entry for this VA from a first MMU table of a first stage, i.e. VA-to-IPA stage, is parsed, and the corresponding IPA is found, $IPA_X\#1$. This first stage corresponds to the address translations discussed above in connection with FIG. 1B. A similar procedure is used in a second stage, i.e. in an IPA-to-PA stage, of address translation to find the PA, here PA#4, to which the IPA, here $IPA_X\#1$, maps according to a second MMU table. Note that $IPA_X\#1$ and $IPA_Y\#1$ may be the same address but kept by the MMU in the second stage of address translation from knowing to which guest OS a requested IPA pertains. Similarly, different applications may use the same VA in the first stage address translations. In practice it may be the virtualization layer that, based on which OS is making a request for translation, controls the MMU to use correct translations for that OS, and the MMU helps ensure that different OSes map to different PAs.

One potential issue related to two-stage MMUs, as may be realized from the above, is the increased MMU table management and additional operations that may be carried out for each memory access request in order to be able to retrieve and use the translation information desired. This makes it difficult to accomplish efficient implementations of two-stage MMUs. Therefore, further development in the area of memory management units is desired.

SUMMARY

Hence, in view of the above, an aim of the disclosure herein is to provide improvements in a two-stage MMU.

Embodiments herein relate to a memory management unit for managing address translations. The memory management unit may be configured to operate in two stages, with a first stage relating to address translations, according to a first address translation table, between a virtual address (VA) space and an intermediate physical address (IPA) space. The second stage may relate to address translations, according to a second address translation table, between the IPA space and a physical address (PA) space. The first address translation table may be associated with a first cache memory and the second address translation table may be associated with a second cache memory.

According to a first aspect of embodiments herein, a method may be performed by the memory management unit for managing address translations. The method may include obtaining a first IPA based on a first VA relating to a first memory access request, using a memory management unit (MMU). A first memory page entry in the second address translation table may be identified by the MMU, based on the first IPA. A first IPA-to-PA translation may be stored in the second cache memory, based on the identified first memory page entry, by the MMU. One or more additional IPA-to-PA translations that are based on corresponding one or more additional memory page entries in the second address translation table may be stored in the second cache memory by the MMU, in response to identification of the first memory page entry. The one or more additional memory page entries may be contiguous to the first memory page entry.

According to a second aspect of embodiments herein, a MMU is described. The MMU may include obtainment circuitry configured to obtain a first IPA based on a first VA relating to a first memory access request. The MMU may also include identification circuitry configured to identify, based on the first IPA, a first memory page entry in the second address translation table. The MMU may also have storage circuitry configured to store, in the second cache memory, a first IPA-to-PA translation, based on the identified first memory page entry. The storage circuitry may be further configured to store, in the second cache memory and in response to the identification of the first memory page entry, one or more additional IPA-to-PA translations that are based on corresponding one or more additional memory page entries in the second address translation table. The one or more additional memory page entries may be contiguous to the first memory page entry.

IPA to PA mapping may not deal with fragmentation, and the IPA to PA mapping may remain and be the same for a further requested, i.e. next, VA belonging to the same memory buffer. The next VA may be in the same memory buffer and may thus map to a PA with the same shift. Storing the IPA to PA translation, and also the one or more additional IPA-to-PA translations as above, may thus increase the chance that relevant IPA-to-PA translations are already in the second cache memory when one or more PAs of one or more next VAs are to be retrieved. Hence, the second memory cache includes likely relevant memory page entries for further memory access requests, and this is accomplished in a manner that may be implemented using relatively few and simple operations. As a result, a number of accesses to the second address translation table in external memory may be reduced, translations may become faster, and there may be a decrease of memory bandwidth used by the memory management unit.

According to a third aspect of embodiments herein, the MMU may be operated to manage address translations. Here, the MMU may obtain a second IPA associated with a second VA-to-IPA translation. The MMU may then identify, based on the second IPA, a second IPA-to-PA translation in the second memory cache or in the second address translation table. The MMU may then determine, based on the identified second IPA-to-PA translation, a second IPA-to-PA shift. The MMU may store the second IPA-to-PA shift in a register associated with the second cache memory. The MMU may store, in the first cache memory, the second VA-to-IPA translation together with a register identifier identifying the register.

According to a fourth aspect of embodiments herein, a MMU is now described. The MMU may include obtainment circuitry configured to obtain a second IPA associated with a second VA-to-IPA translation. Identification circuitry may be configured to identify, based on the second IPA, a second IPA-to-PA translation in the second memory cache or in the second address translation table. Determination circuitry may be configured to determine, based on the identified second IPA-to-PA translation, a second IPA-to-PA shift. In addition, storage circuitry may be configured to store the second IPA-to-PA shift in a register associated with the second cache memory. The storage circuitry may be being further configured to store, in the first cache memory, the second VA-to-IPA translation together with a register identifier identifying the register.

As should be realized, the second IPA-to-PA shift may be relevant for, and be used by, several IPA-to-PA memory page entries, such as contiguous IPA-to-PA memory page entries as discussed above, which may map IPA to PA with one and the same shift. Hence, the second IPA-to-PA shift stored in the register may replace storage of several separate IPA-to-PA translations, in the form of memory page entries, in the second cache memory. Such a replacement may save space in the second cache memory, and may enable more IPA-to-PA mappings be covered by the second cache memory. This in turn may enable more pre-fetched IPA-to-PA translations to be stored in the second cache, and may thereby increase the chance that further requested VAs, relating to further memory requests, may be translated to PAs via the faster second memory cache access instead of accessing the slower second address translation table.

BRIEF DESCRIPTION OF THE DRAWINGS

Examples of embodiments herein are described in more detail with reference to the appended schematic drawings, in which.

DETAILED DESCRIPTION

Note that numbered naming in the following, for example names comprising "first", "second", etc., do not, as such, imply an order, and should simply be construed as a neutral way of accomplishing different naming to be able to refer to different objects by unique names.

Figure 3:
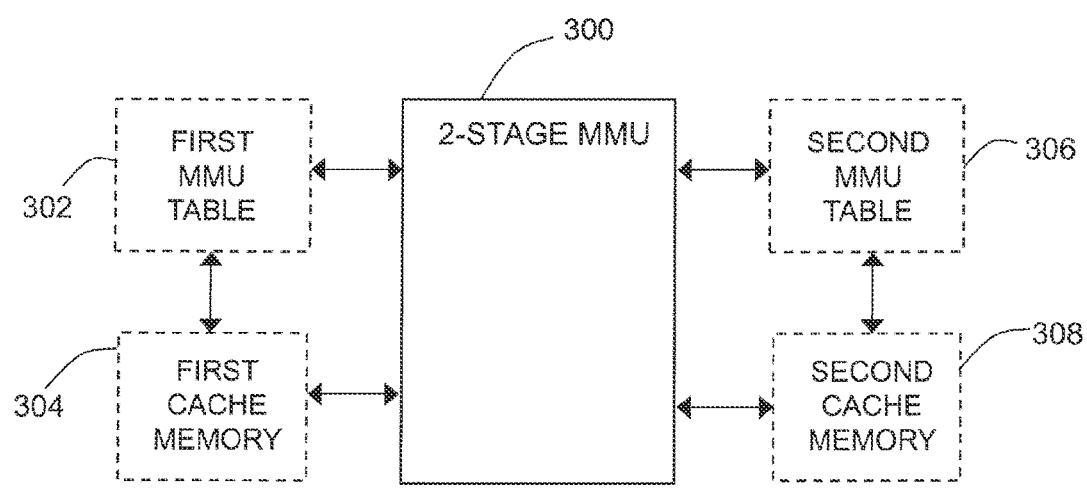
FIG. 3 is a schematic block diagram depicting a two-stage MMU 300 in which embodiments herein may be implemented.

FIG. 3 is a schematic block diagram depicting a memory management unit 300 in which embodiments herein may be implemented. A Memory Management Unit (MMU) is an example of the memory management unit 300. The memory management unit 300 may, for simplicity herein, be referred to as the MMU 300, but this shall not be construed as limiting. The MMU 300 is associated with, and has access to, a first address translation table 302 and a first cache memory 304, which are relating to a first stage of address translations as described below. The first cache memory 304 is associated with the first address translation table 302. A first MMU table is an example of the first address translation table 302. The first address translation table 302 may, for simplicity herein, be referred to as the first MMU table 302, but this shall not be construed as limiting.

The two-stage MMU 300 is further associated with a second address translation table 306 and a second cache memory 308, which are associated with a second stage of address translations as described below. The second cache memory 308 is associated with the second address translation table 306. A second MMU table is an example of the second address translation table 306. The second address translation table 306 may, for simplicity herein, be referred to as the second MMU table 306, but this shall not be construed as limiting. The respective cache memory 304, 308 may be a respective translation lookaside buffer (TLB). Note that as shown, and similar to the case of the one-stage MMU described in the background section of this disclosure, the respective MMU tables 302, 304 may be stored in memory that is physically located outside the two-stage MMU 300. However, it is also possible for either or both of the respective MMU tables 302, 304 to be located in memory that is physically integrated with the MMU 300 to some degree, and to thus be considered to be in the two-stage MMU 300. Similarly, with respect to the respective cache memory 304, 308, it may be one or more units that are physically separated from the two-stage MMU 300, but it is also possible for either or both of the respective cache memories 304, 308 to be physically integrated within the MMU 300 to some degree, and thus to be considered to be within the two-stage MMU 300. The MMU 300 is, similarly as described for the two-stage MMU above, configured to operate in two stages. The first stage relates to address translations, according to the first MMU table 302, between a virtual address (VA) space and an intermediate physical address (IPA) space. The second stage relates to address translations, according to the second MMU table 306, between the IPA space and a physical address (PA) space.

Note that, as described above, there may be one or more additional first-stage MMU tables, one per guest OS. However, this is not necessary for embodiments herein and in examples to follow there will, for presentational purposes, and in order not to burden the reader with too many details, be shown a situation with one first stage, i.e. corresponding to a situation with one guest OS. This is not to be construed as limiting in any sense, and embodiments herein are of course compatible with, and may also be used with, multiple guest OSes, which, as explained, is a reason for using a two-stage MMU.

Also, note that, similarly as for a one-stage MMU, the first cache memory 304 and the second cache memory 308 may be one and the same physical cache memory that is split or shared so that it logically still corresponds to separate cache memories. Moreover, although expected to be the case in some applications, the first cache memory 304 may not be necessary for all embodiments herein, as will be understood from the below.

When there is a request for a VA, a pre-fetch mechanism may load the translation information, possibly in the form of a memory page entry of the first MMU table 302 in the first memory cache 304, not only for the VA, but also for an estimated next VA or VAs, i.e. that are likely to be requested next. The next VA or VAs may be such that are contiguous word or few-words-wise relative the requested VA. For example, if a first requested VA is VA0 and the estimated next, or further, VAs are VA1 and VA2, then VA1=VA0+delta and VA2=VA1+delta, where delta is an expected step between VAs. For example, if the first request is a read of 64 bytes at address VA0, then the delta may be 64 bytes. The pre-fetch mechanism may be similar for the first-stage as for the one-stage MMU described in the background of this disclosure.

However, simply replicating this mechanism for the second stage may not be particularly useful, since the IPA corresponding to the next VA or VAs may be quite distant from the first IPA. It may instead be logical to instead consider that, at IPA level, the page entries for the IPAs that correspond to the next VA or VAs instead may be pre-fetched and put in the second cache memory 308 associated with the second MMU table 306, i.e. instead of the page entries for the IPAs close to the first IPA requested.

However, such a mechanism may be time-consuming and involve excessive parsing of MMU tables in the background in order to reach the same level of pre-fetch efficiency as for a one-stage MMU.

Embodiments herein, as will be described next, may limit the number of operations in the second stage, i.e. operations for storing relevant memory page entries in the second memory cache 308, by utilizing heuristics related to the way the IPAs of different OSes are mapped to PAs, i.e. the translation between IPA and PA for each different OS. One insight is that in a two-stage MMU used in virtualization, such as the MMU 300, the second stage may be used to isolate the different OSes from one another, so as to not address fragmentation issues. For instance, a buffer seen as a contiguous space in the VA space of an application running on a guest OS is likely to be fragmented in IPA space, but the way the fragments in IPA space are mapped to PA space is likely to be flat, i.e. the address delta, or in other words offset, between one fragment in IPA and the corresponding fragment in PA may be the same for the IPA fragments that correspond to the original contiguous VA buffer. The above described pre-fetch mechanism for the first-stage may continue to be used, which will put in the first memory cache 304 the different page entries of the first MMU table 302 to be used to get the IPAs corresponding to the next VAs.

Figure 4:
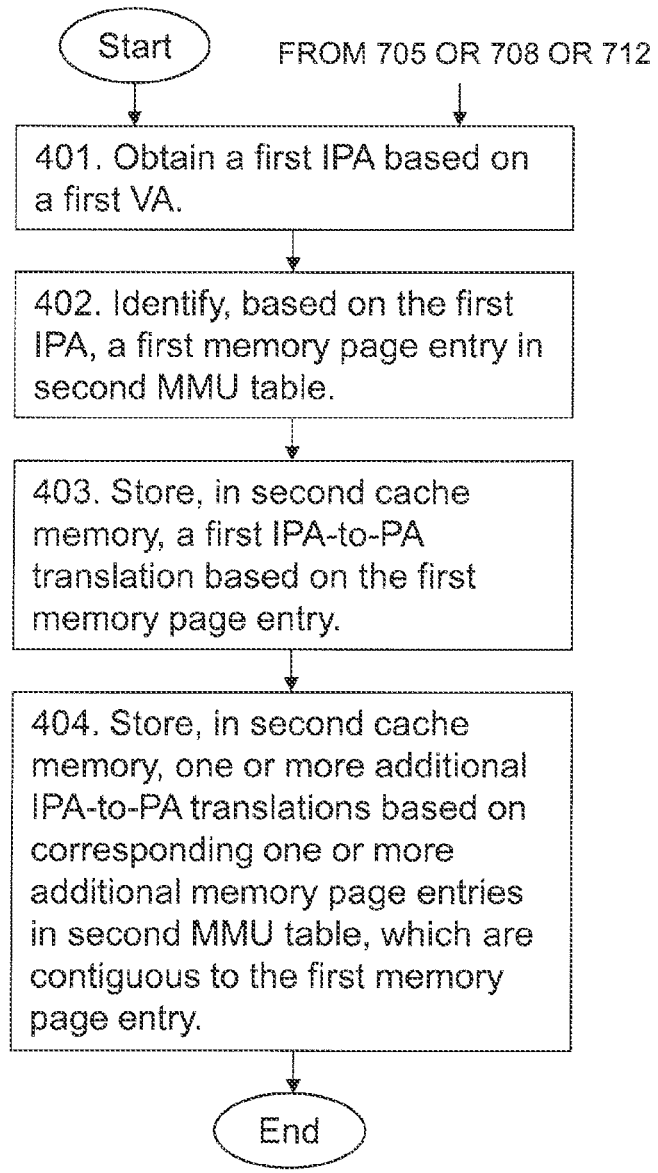
FIG. 4 is a flow chart illustrating a method performed by a MMU, according to embodiments herein.

Examples of embodiments herein relating to a method in the MMU 300, for managing address translations, will now be described with reference to the flowchart depicted in FIG. 4. Action 401 may start separately from, or may follow after Actions 701-705, Actions 706-708 and/or or Actions 709-712 described below.

Action 401 will now be described. Here, the MMU 300 may obtain a first IPA based on a first VA relating to a first memory access request. The memory access request may be a read or write request. The request may be obtained, for example, received, from a unit being served by the MMU 300, a unit that uses the MMU 300 to get a PA to be able to read or write memory content based on a VA, such as a Central Processing Unit (CPU). When the units served by the MMU 300 and the MMU 300 are not integrated but are separated physically or logically from the MMU 300, the MMU 300 may obtain the first VA by receiving it from the unit being served by the MMU 300. As explained previously, the unit being served by the MMU 300, typically a CPU, may in turn act on behalf of a process, such as an application, running on a Guest OS.

The first VA may belong to a memory buffer that has been allocated in a memory block in the IPA space, which maps to the PA space with a common shift. As used herein, a shift relating to an address translation refers to the difference between the addresses involved in the address translation. By a common shift, it is meant that the IPAs in the memory block have one and the same shift to the PA space, i.e. each IPA in the memory block maps to a respective PA with one and the same shift, or in other words, that the memory block in IPA maps to the PA space in a flat way. This will be further explained and illustrated below. Note that, especially in view of that, as mentioned above, fragmentation is mainly occurring in IPA space, there may in some practical situations be large contiguous IPA memory blocks available that map to PA space with a respective common shift. In any case it is understood that it is relatively easy, if desirable or needed, to configure the virtualization layer, the MMU 300, or in any other way make sure, depending on environment of implementation, that each guest OS is allocated large contiguous IPA memory blocks that map to PA space with a respective common offset. In other words, each guest OS may manage, and/or it may be influenced so that each guest OS has available, big memory chunks or blocks with the same access right, and that may respectively map from IPA space to PA space with a respective common shift. Thereby, the memory block, or such memory blocks in general, in the IPA space may be available for allocation of memory buffers. In some embodiments there may be a separate action that, prior to action 401, allocates the memory buffer in the memory block in the IPA space, which maps to the PA space with the common shift.

Action 402 will now be described. Here, the MMU 300 identifies, based on the first IPA, a first memory page entry in the second MMU table 306. The first memory page entry is thus the memory page entry in the second MMU table 306 that comprises the first IPA, typically by being associated with a range of addresses that comprises the first IPA that may be determined by a start address and memory page size in the memory page entry, similar as in the example of FIG. 1A.

Action 403 will now be described. In this Action, the MMU 300 stores, in the second cache memory 308, a first IPA-to-PA translation based on the identified first memory page entry. The first IPA-to-PA translation may be stored in the form of a copy of the first memory page entry, but may also be stored in another form, which may be desirable for various reasons. Hence, this action may result in there being cached, in the second cache memory 308, a translation for IPAs-to-PAs for a range of IPAs as defined by the first memory page entry.

Action 404 will now be described. Here, the MMU 300 stores, in the second cache memory 308, and in response to identification of the first memory page entry in Action 402, one or more additional IPA-to-PA translations that are based on corresponding one or more additional memory page entries in the second MMU table 306. The one or more additional memory page entries are contiguous to the first memory page entry.

That is, Action 404 may be considered to represent a second stage pre-fetch, where the pre-fetched one or more IPA-to-PA translations are not resulting from corresponding one or more pre-fetched VA-to-IPA translations, need not be in response to a VA-to-IPA pre-fetch, and need not map to a VA-to-IPA translations in the first cache memory 304. By contiguous it should be understood to mean that the memory pages and addresses associated with the involved page entries are contiguous, i.e. so that they form a contiguous range of addresses. For example, if the first memory page entry is associated with IPAs in a range 17-32, the additional memory page entries associated with IPAs in a range 1-16 and/or in a range 33-48 are contiguous to the first memory page entry.

Note that since the IPA to PA mapping may not involve dealing with fragmentation, the IPA to PA mapping remains and may be the same for further requested, i.e. next, VA belonging to the same memory buffer. Hence, even if the VA to IPA mapping is fragmented, and a next VA may not belong to same memory page entry in the first MMU table 302 as the first VA in Action 401, the next VA may still be in the same memory buffer, and may thus likely map to a PA with the same shift. Storing the IPA to PA translation based on the first memory page entry in the second cache memory 308, in accordance with action 403, and also the one or more additional IPA-to-PA translations, in accordance with action 404, may thus increase the chance that relevant IPA-to-PA translations may already be in the second cache memory 308 when one or more PAs of one or more next VAs are to be retrieved. Hence, embodiments herein make the second memory cache 308 include likely relevant memory page entries for further memory access requests, and accomplish this in a manner that may be implemented using relatively few and simple operations. For example, as a result the number of accesses to the second MMU table 306 in external memory may be reduced, MMU translations may become faster, and there may be a decrease of memory bandwidth used by the MMU 300.

In some embodiments, the one or more additional memory page entries may be such that they additionally map IPAs to PAs with a same first IPA-to-PA shift as the first memory page entry. This works since the contiguous one or more additional memory page entries, as understood in view of the above discussion, may be of greater use to store IPA-to-PA translations in the second cache memory 308 if they map with the same shift as the first memory page entry. A same shift indicates an increased possibility that the one or more additional memory page entries may be associated with the same memory buffer as the first memory page entry, and may thus indicate a greater chance that the stored one or more additional IPA-to-PA translations may be relevant for a next VA request resulting from a memory access request.

In some embodiments, the one or more additional memory page entries may be such that they are additionally associated with same or corresponding access rights as the first memory page entry. This may be desirable in a practical implementation, since a difference in access rights may mean, and may be considered an indication of, belonging to a different memory buffer than the first memory page entry.

Moreover, it should be noted that, since the IPA-to-PA mapping may not involve dealing with fragmentation, fewer memory page entries but of a larger size may be used in the second MMU table. Or in other words, memory buffer areas belonging to a given guest OS may be described using larger memory pages for the IPA to PA mapping, contrary to devices, such as register areas, for which smaller memory page may be used. This may further increase the chance that when a further, i.e. next, VA is requested, there may already be relevant IPA-to-PA translations in the second cache memory 308.

In some embodiments, where the second address translation table 306 utilizes at least two sizes of memory pages, a smaller size and a larger size, the first IPA-to-PA address translation and the one or more additional address translations may be stored in the second cache memory 308 in response to identification that they are of the larger size. A memory page entry that is of small size in the second MMU table 306 is less likely to be followed by a next VA that belongs to the same memory buffer. For example, when a conventional small sized memory page is used in the second MMU table 306, this may indicate a mapping relating to a device, for example, a register area, which is not expected to be followed by a related further request and it may thus not be relevant to use this as a trigger to perform second stage pre-fetch. It may thus be considered advantageous to first identify that the first memory page entry is of the larger size and then store it. If a memory page entry of small size is identified, it may not be helpful to store, and it may even be considered more efficient not to store it. A conventional small sized memory page is typically in the order of one or a few kBs of address space and a conventional large sized memory page may be on the order of one MB of address space, although the sizes may differ depending on architecture and technology. Indeed, there may be several sizes, not simply a large one and a small one. For instance, with 64 bit processors, addresses may be 48 bits, and there may be 4 k pages (small), 2 MB pages (large), 1 GB pages (very large), 512 GB pages (huge), 64 TB pages (quite huge). Or, with another type of addressing there may be, 64 kB pages (small), 512 MB pages (large), and 4 TB pages (huge). In, for example, 32 bit ARM processors two alternative "page size" modes may be supported, either 4 kB (small) and 1 MB (large), or 64 kB (small) and 16 MB (very large).

It may be realized from the above that it is possible, reasonable, and beneficial that the second MMU table 306 use significantly larger memory pages than the first MMU table 302. For example, the second MMU table 306 may utilize memory pages where each page includes several MBs of address space, for example, at least 8 or 16 MB. Similarly, large memory pages for the first MMU table may be less beneficial because of fragmentation in the IPA space, and if nevertheless supported, they may in practice not often be utilized. Hence, in some embodiments, the above-mentioned larger sized memory page utilized by the second address translation table 306 may be larger than memory pages being utilized by the first address translation table 302.

Note that if a next VA results in an IPA that is outside the IPA-to-PA address translations that have been stored in the second cache memory 308, the actions 401-404 may simply be performed with this next VA replacing the first VA in action 401.

Figure 5:
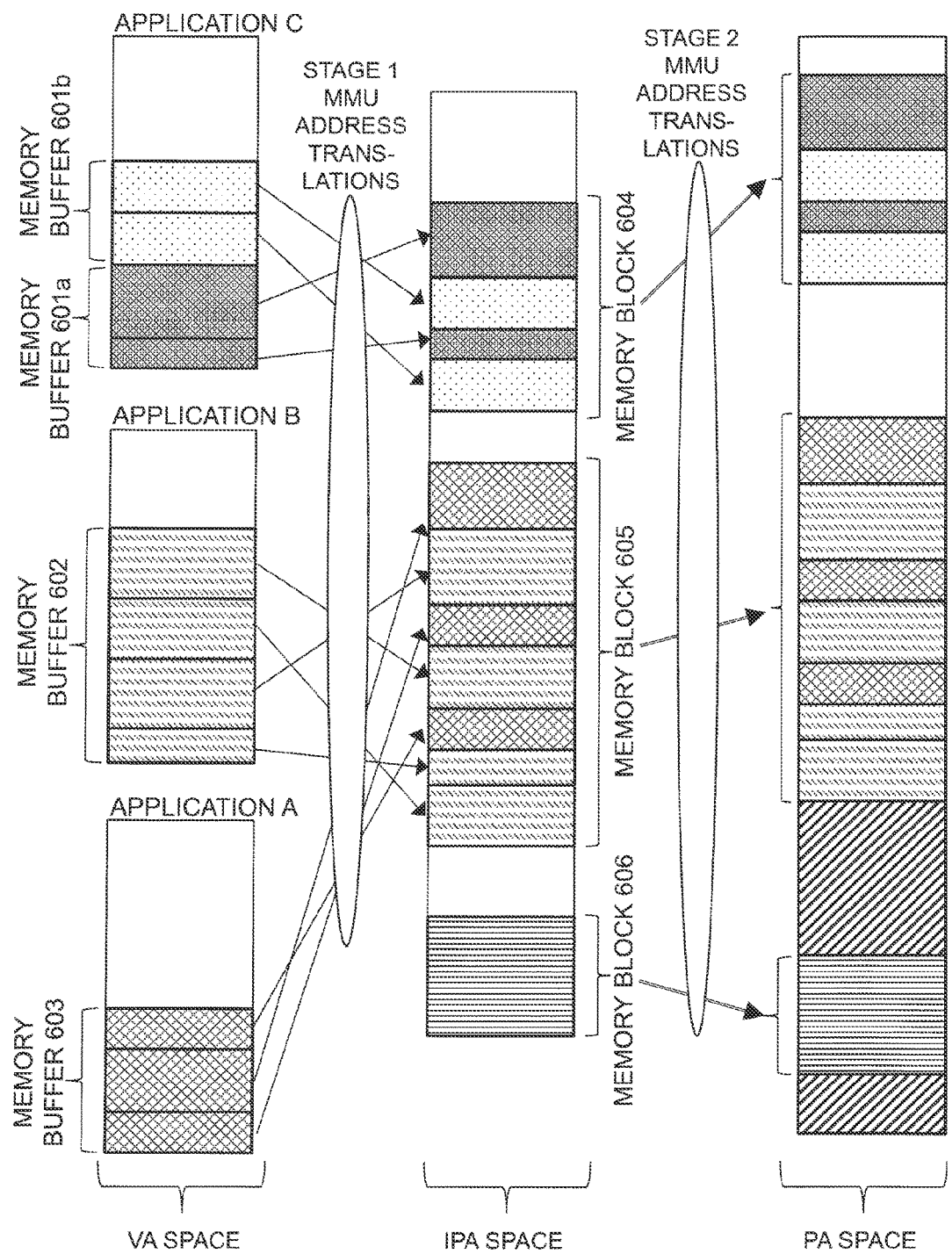
FIG. 5 is a schematic combined block and flowchart to facilitate understanding of embodiments herein.

FIG. 5 is a schematic combined block and flowchart to facilitate understanding of embodiments herein. The VA space is exemplified using three applications A-C that execute in a guest OS. Each application is illustrated to include at least one memory buffer that respectively is contiguous in the VA space. An application C comprises a memory buffer 601*a* and a memory buffer 601*b*. An application B comprises a memory buffer 602, and an application A comprises a memory buffer 601. Each memory buffer is shown with its own pattern for recognition and includes one or more chunks, or parts, with each part being illustrated by a square filled with the recognition pattern of the memory buffer to which the part belongs. As can be seen, the respective memory buffer is fragmented in the IPA space but still maps to one and the same memory block. For example, the memory buffers 601*a*, 601*b* map to a memory block 604 in the IPA space and the memory buffers 602, 603 map to a memory block 605 in the IPA space.

There is also a memory block 606 shown in the IPA space that has no counterpart in the VA space, which may be kernel memory of the guest OS. The first stage address translation, i.e. VA-to-IPA, according to the first MMU table 302, may serve the purpose of separation and/or hiding, in addition to addressing fragmentation issues. Further, as is illustrated, the respective memory block 604, 605, 606 may respectively map, with a respective common offset, i.e. in a flat way, to the PA space. Note that, although now shown here, there may be memory blocks associated with one or more other, additional guest OSes allocated in the PA space. The second stage of address translations, i.e. IPA-to-PA, according to the second MMU table 306, may serve the purpose of separation and/or hiding, but may not be, and need not be, dealing with fragmentation issues.

Figure 6A:
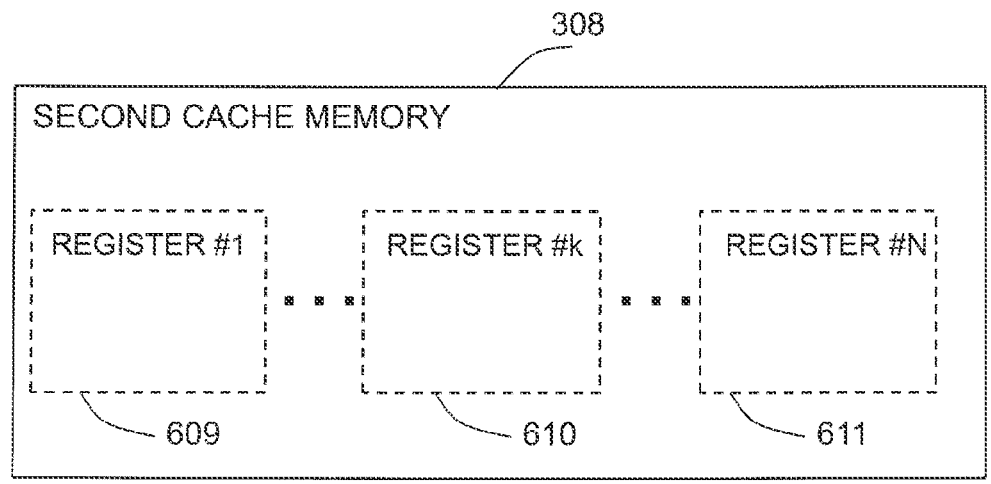
FIG. 6A is a schematic block diagram depicting an enhanced second cache memory, according to embodiments herein.

FIG. 6A is a schematic block diagram depicting the second cache memory 308 in a version include a number N of registers and is shown including a first register 609, a kth register 610, and an Nth register 611. N is equal to or greater than 1, and k indicates a specific one of the one or more registers, i.e. k is any number between 1 and N. If N=2 there are thus 2 registers. The one or more registers 609-611 may be dedicated parts, such as allocated parts, of this "normal" cache memory, such as the second cache memory 308. However, it is also possible to have one or more hardware specific registers 609-611 that are associated with a "normal" cache memory but may be physically different in some way, and/or may be integrated with or separate from this normal "cache memory".

Respective one or more registers 609-611 may be associated with an "enable" bit, or flag, that may be set when the selected register is in use and may be used to signal that the selected register is in use. When the registers have a set enable bit, the register associated with a longest time since last used may be released and signaled to be available for use by switching value of the enable bit. Also, whenever there may be a flush of the second cache memory 308, or the IPA-to-PA translations stored therein are considered invalid for some reason, the registers concerned may be considered free and the respective enable bit may be changed accordingly.

Figure 1A:
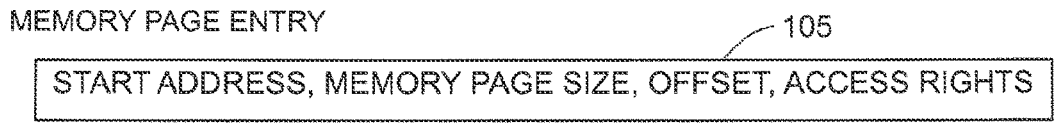
FIG. 1A schematically illustrates an example of content in a memory page entry of a MMU table.
Figure 1B:
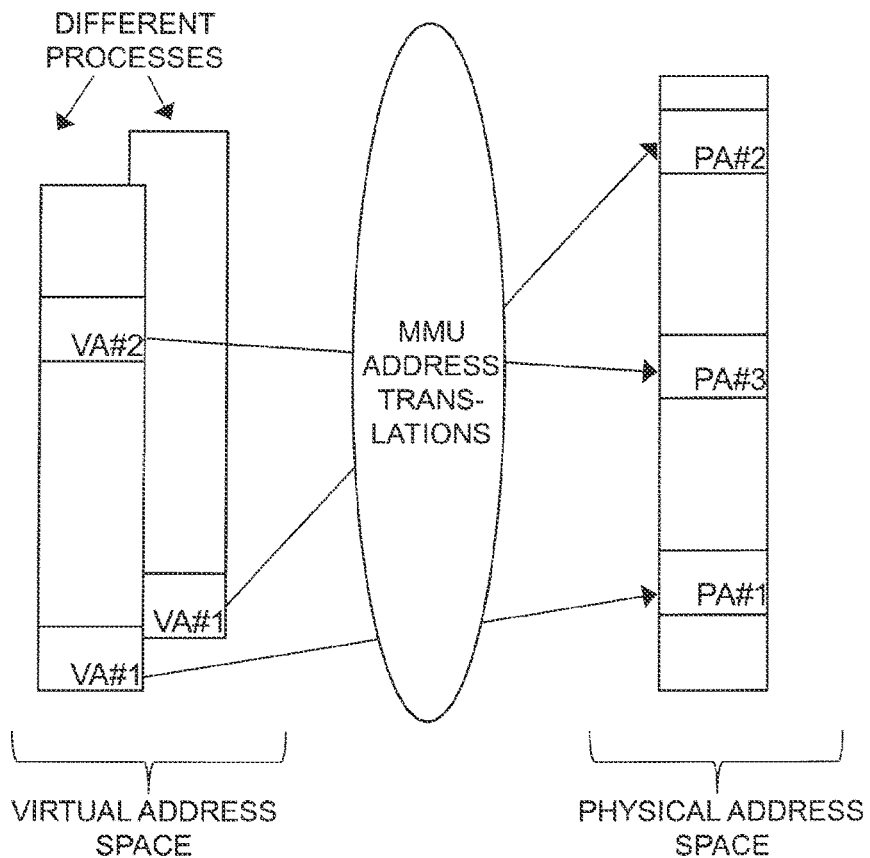
FIG. 1B schematically illustrates the principle of MMU address translations.
Figure 1C:
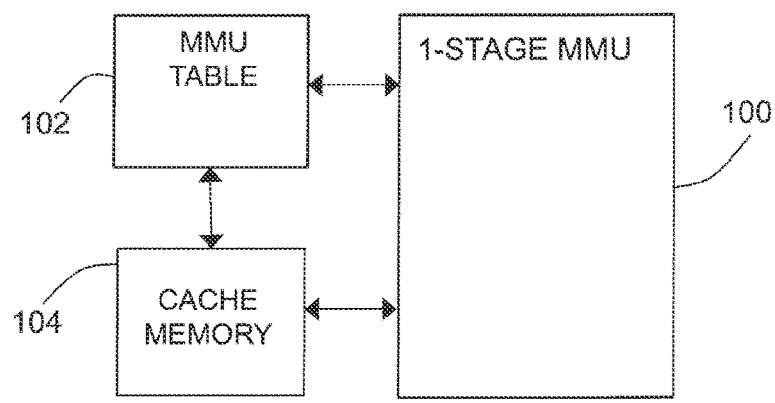
FIG. 1C schematically illustrates in a simplified manner a one-stage MMU 100.
Figure 2:
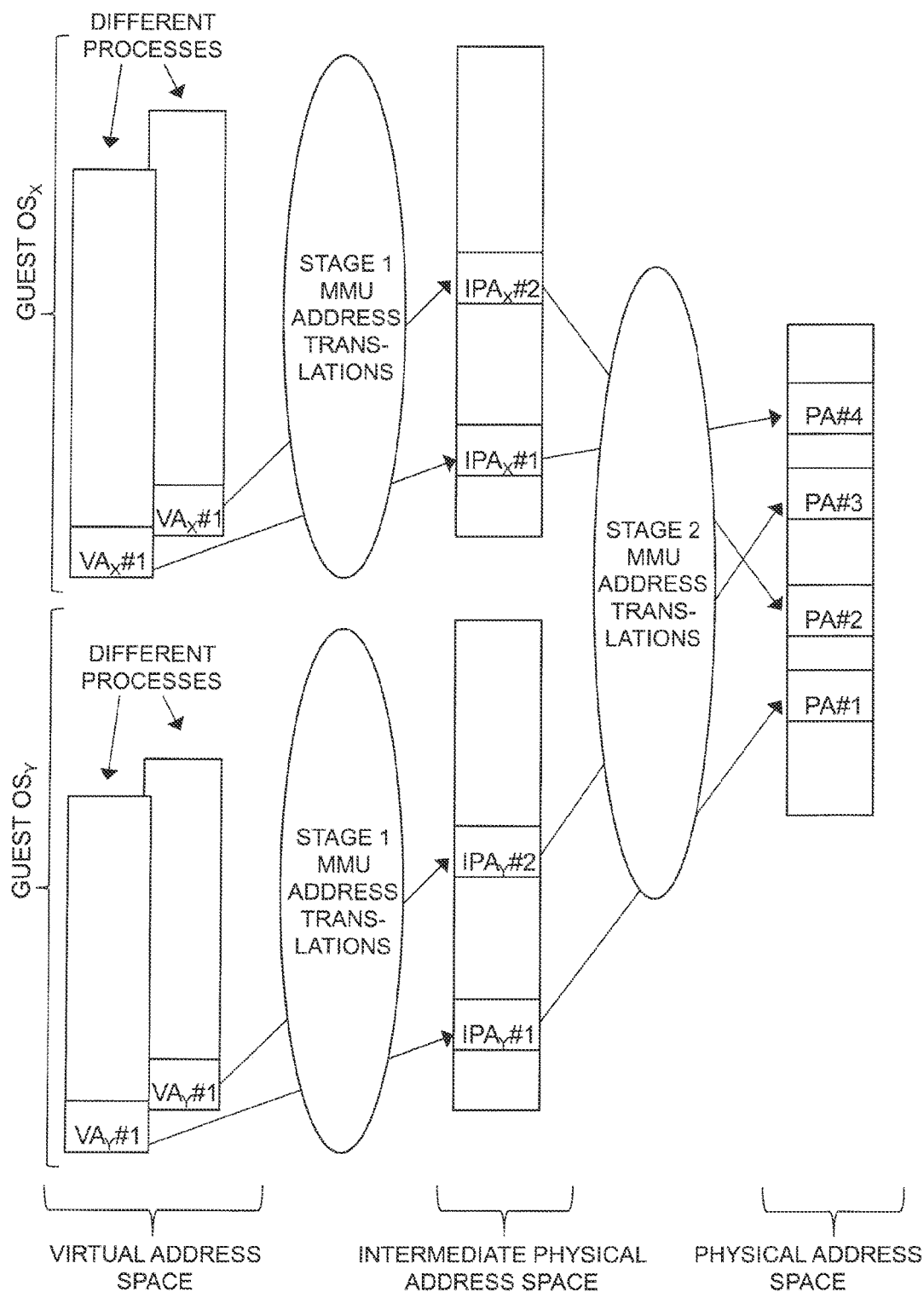
FIG. 2 schematically illustrates the principle of two-stage address translations in a two-stage MMU.
Figure 6B:
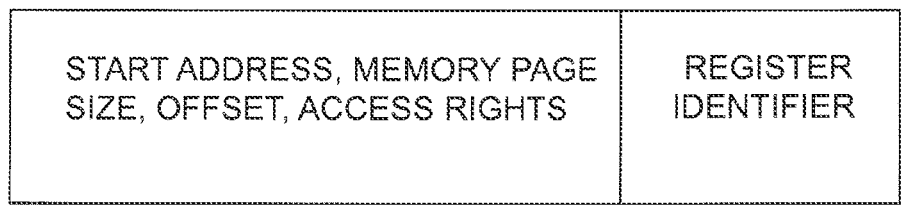
FIG. 6B schematically illustrates an example of content in an extended memory page entry of a first MMU table, according to embodiments herein.

FIG. 6B schematically illustrates an extended memory page entry of the first cache memory 304, which in addition to including conventional information as shown in FIG. 1A, additionally includes an identifier identifying a selected one of the multiple registers 609-611, for example, the kth register 610. FIG. 6B thus is an example of how an address translation, such as VA-to-IPA translation, here in the form of a memory page entry, may be stored together with a register identifier identifying the register in the first cache memory 304.

Certain embodiments, where the second cache memory 308 may be replaced by the enhanced second cache memory 608 and that may utilize said extended memory page entries in the first cache memory 304, will be described next.

Figure 7:
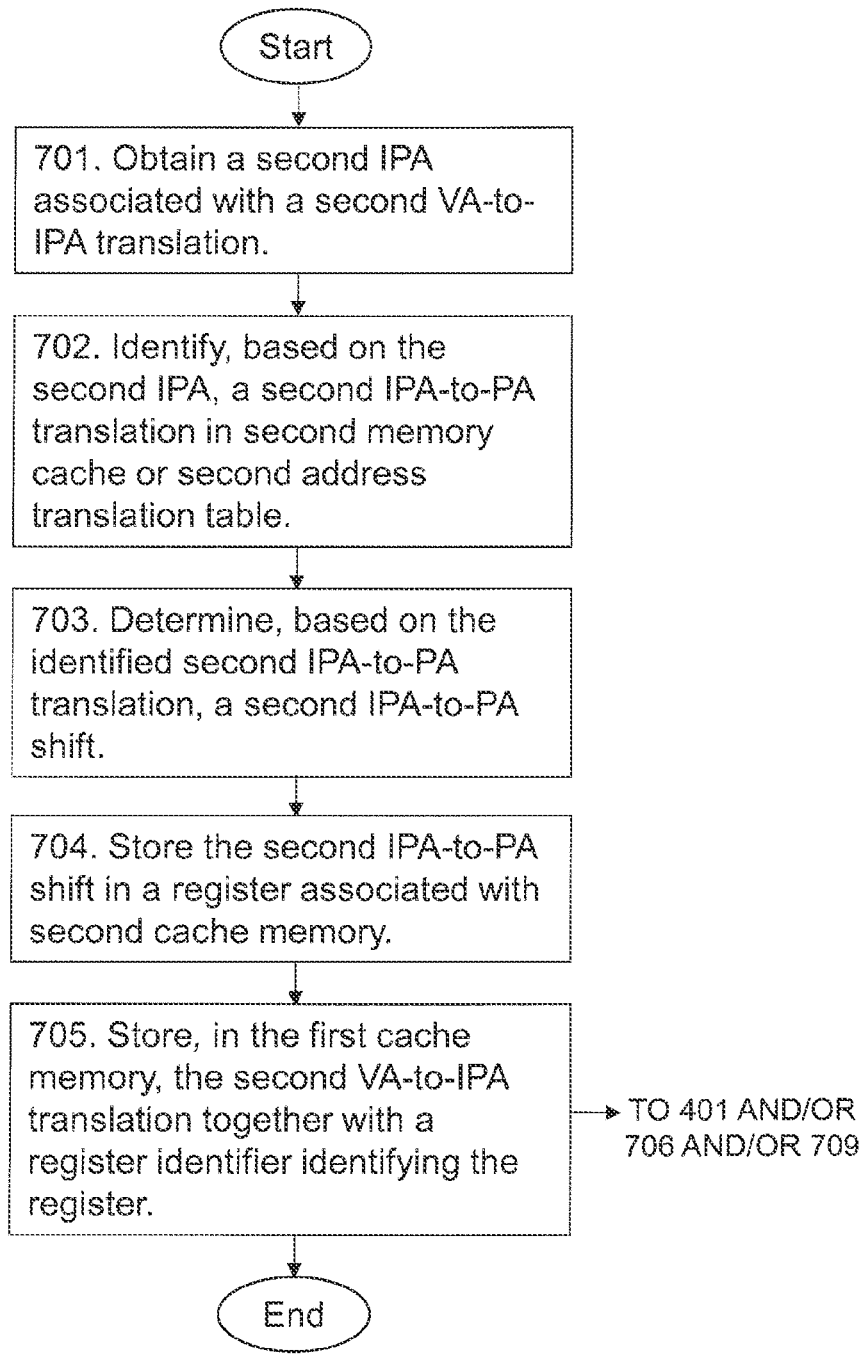
FIG. 7 is a further flow chart illustrating a method performed by a MMU, according to embodiments herein.
Figure 8:
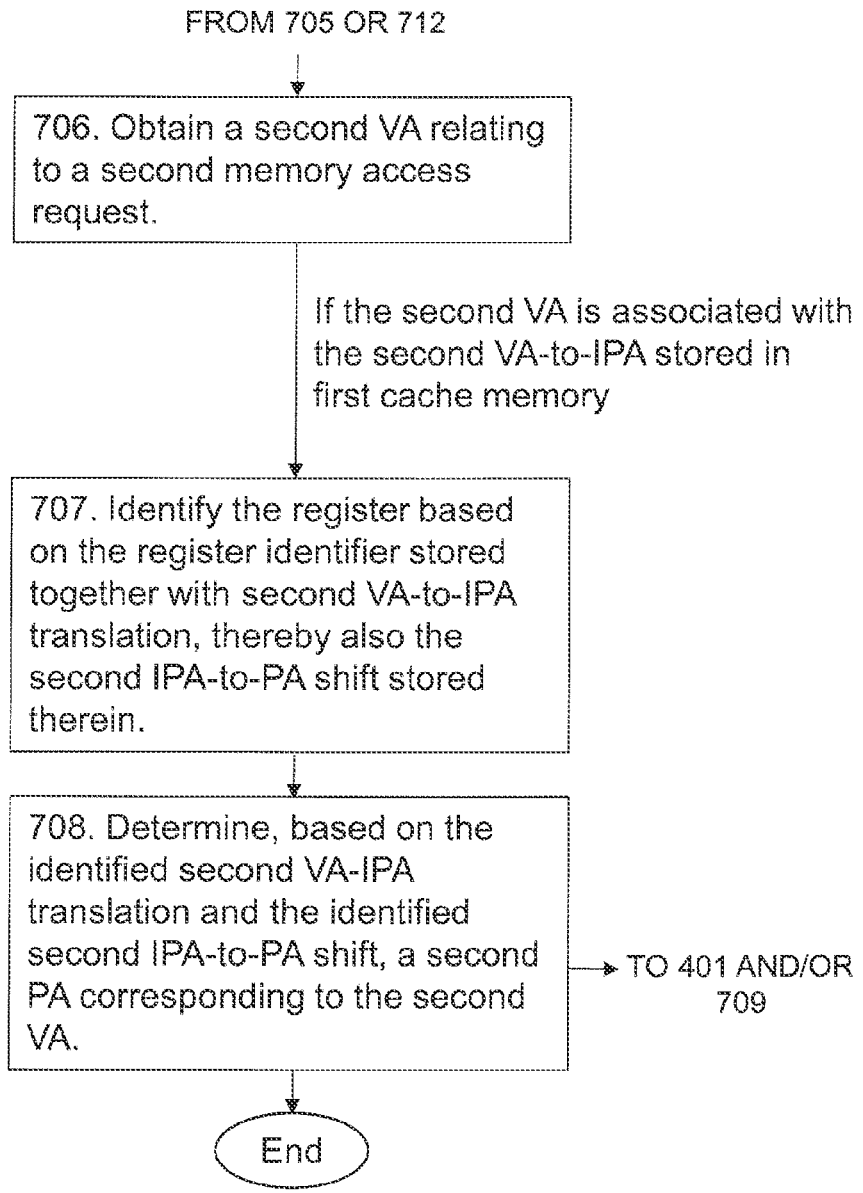
FIG. 8 is a first continuation of the flow chart of FIG. 7.
Figure 9:
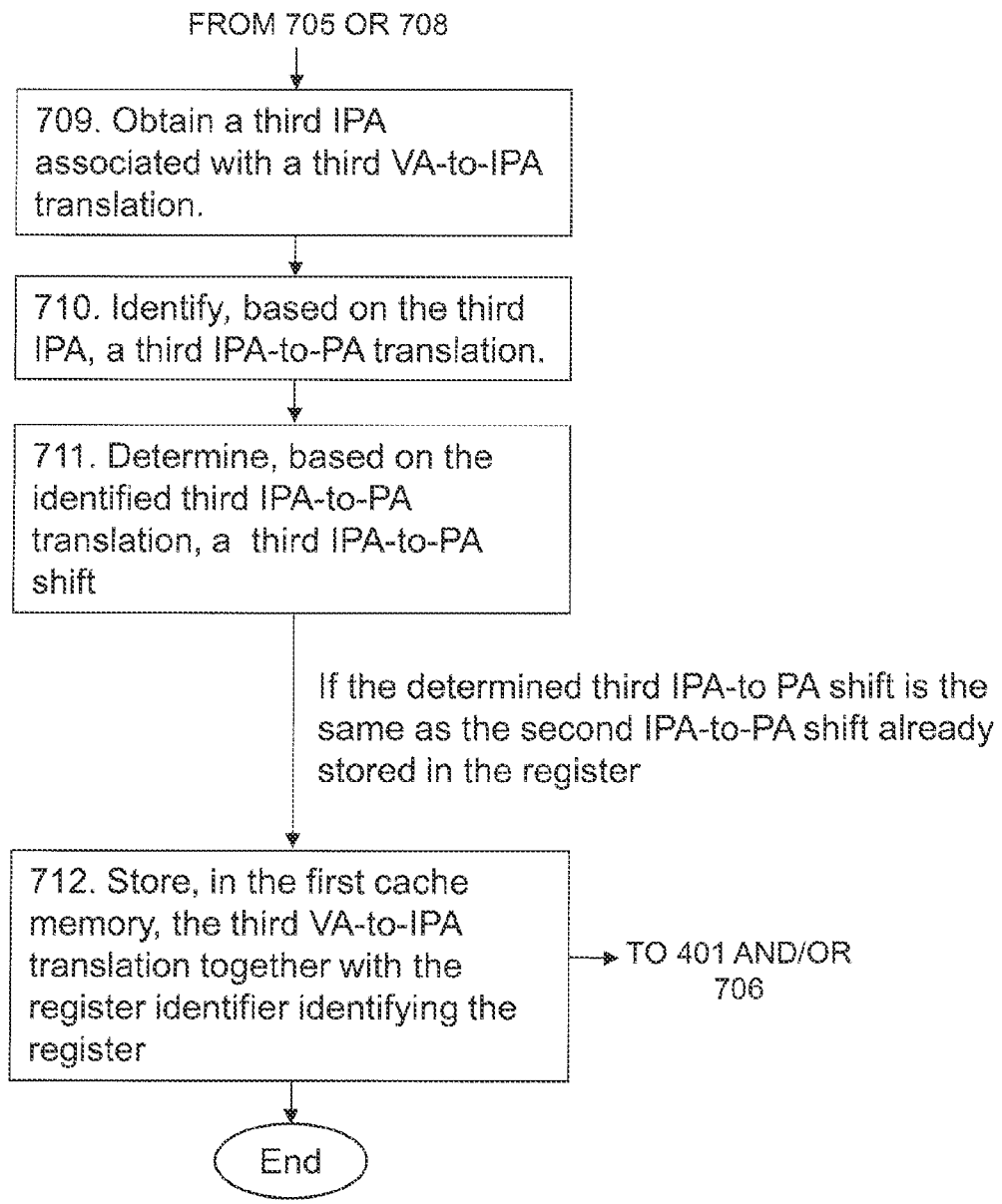
FIG. 9 is a second continuation of the flow chart of FIG. 7.

In addition, certain further embodiments herein relating to a method of operating the MMU 300 for managing address translations will now be described with reference to the flowchart depicted in FIG. 7. Action 701 may start separately from, or may follow after, Actions 401-404 described above.

Action 701 is now described. Here, the MMU 300 obtains a second IPA associated with a second VA-to-IPA translation. The second IPA may be obtained by using the first address translation table 302 or the first cache memory 304. The second VA-to-IPA translation may correspond to a memory page entry in the first address translation table 302. Note that if the second IPA is obtained by using the first cache memory 304, the second VA-to-IPA translation may be stored therein in the form of a copy of the memory page entry, but may also be stored in another form.

Moreover, the second IPA may be obtained based on a VA resulting from a memory access request. Another possibility is that the second IPA is obtained in response to a first-stage pre-fetch action, i.e. obtained from the first address translation table 302, based on a VA estimated to be requested next, with the aim that this should result in translations relating to the estimated VA in one or both of the first and second cache memories 304, 308. In both cases the VA is then translated to the second IPA according to the second VA-to-IP translation.

Action 702 will now be described. Here, the MMU 300 identifies, based on the second IPA, a second IPA-to-PA translation in the second memory cache 308 or in the second address translation table 306. The second IPA-to-PA translation may correspond to a memory page entry in the second address translation table 306. Note that the second IPA-to-PA translation may be stored in the second memory cache 308 in the form of a copy of the memory page entry, but may also be stored in another form.

Action 703 will now be described. In this Action, the MMU 300 may determine, based on the identified second IPA-to-PA translation, a second IPA-to-PA shift. The second IPA-to-PA shift may be determined by calculating a difference between a IPA and PA involved in the second IPA-to-PA translation. In some cases the shift may instead be available directly from the IPA-to-PA translation, in case the IPA-to-PA translation is in the form of a memory page entry that comprises a field with the shift.

In Action 704, the MMU 300 stores the second IPA-to-PA shift in a register, such as the kth register 610, associated with the second cache memory 308.

In Action 705, the MMU 300 stores, in the first cache memory 304, the second VA-to-IPA translation together with a register identifier identifying the register, such as the kth register 610.

As should be realized, the second IPA-to-PA shift may be relevant for, and be used by, several IPA-to-PA memory page entries, such as the contiguous IPA-to-PA memory page entries as discussed above, which may map IPA to PA with one and the same shift. Hence, the second IPA-to-PA shift stored in the register may replace storage of several separate IPA-to-PA translations in the form of memory page entries, in the second cache memory 308. Such replacement saves space in the second cache memory and enables more IPA-to-PA mappings to be covered by the second cache. This in turn also enables more pre-fetched IPA-to-PA translations to be stored in the second cache and thereby increases the chance that further requested VAs, relating to further memory requests, may be translated to PAs via faster second memory cache access instead of accessing the slower second address translation table 306.

Actions 706-708 that will be described next relate to how the register identifier, the register, and the second IPA-to-PA shift, may be used after Actions 701-705 have been performed. Action 706 may follow after Actions 701-705 described above or Actions 709-712 described below.

Action 706 is now described. The MMU 300 may obtain a second VA relating to a second memory access request. If, for example, in a situation when the second VA is associated with the second VA-to-IPA translation that (as resulted from Action 705 above) is stored in the first cache memory 304, Actions 707-708 may be performed.

Action 707 will now be described. Here, The MMU 300 identifies the register, such as the kth register 610, based on the register identifier stored together with the second VA-to-IPA translation, and thereby also identifies the second IPA-to-PA shift stored therein.

Action 708 is now described. The MMU 300 determines, based on the identified second VA-to-IPA translation and the identified second IPA-to-PA shift, a second PA corresponding to the second VA.

Actions 709-712 that will be described next relate to how the second IPA-to-PA shift stored in the register for example may be used to replace storage of separate IPA-to-PA translations in the second cache memory. Action 709 may follow after Actions 701-705 or Actions 706-708.

Regarding Action 709, the MMU 300 obtains a third IPA associated with a third VA-to-IPA translation. As should be realized, the third IP and third VA-to-IPA translation may be not the same as the second IPA and the second VA-to-IPA translation in Action 701, but may be of corresponding type and format, and be obtained similarly.

In Action 710, the MMU 300 identifies, based on the third IPA, a third IPA-to-PA translation in the second memory cache 308 or in the second address translation table 306.

In Action 711, the MMU 300 determines, based on the identified third IPA-to-PA translation, a third IPA-to-PA shift. This shift may be determined in a corresponding manner as the second IPA-to-PA shift in Action 703.

If, for example, in a situation when the determined third IPA-to PA shift is (identified through comparison to be) the same as the second IPA-to-PA shift already stored in the register (as resulted from Action 705 above), Action 712 may be performed.

With respect to Action 712, the MMU 300 stores, in the first cache memory 304, the third VA-to-IPA translation together with the register identifier identifying the register. Note that the third IPA-to-PA translation in Action 710 may have been identified in the second memory cache 308, in the form of a memory page entry, and thus already may be in the second memory cache as a separate entry. This may be the result from "second stage only" pre-fetch as described above in connection with FIG. 4, with pre-fetch of the one or more additional IPA-to-PA address translations. In this case, the previous entry may be removed after Action 712 to free memory space, since the corresponding information is now instead stored in the register.

The embodiments discussed above in connection with FIG. 7 will now be further exemplified, as well as further possibilities and options relating to managing of address translations involving the register and a register identifier.

As already indicated, an underlying idea with using the register, such as the registers 609-611, is to be able to save space in the second cache memory 308 by not storing as many descriptors, i.e. separate storage of IPA-to-PA translations, therein, which describe the same shift. The size of a memory cache is limited, and it is beneficial to be able to use it efficiently, translations from more entries may be stored, etc., as already indicted in the foregoing. The use of the registers may be especially useful in case IPA-to-PA translations correspond to memory page entries at a small page level. This could happen due to reasons discussed above, because, for instance, one physical small page may no longer be mapped to OS memory for security reasons. Hence, the method described in connection with FIG. 7 may be an efficient supplement to the method described in connection with FIG. 4 that, as has been explained, is more efficient and useful in case IPA-to-PA translations correspond to memory page entries at a large page level.

For example, in an implementation, eight registers may be used with register identifiers, for example, numbers 1-8, that may be referred to as InDeX (IDX) in the following, and the registers to IDX registers for simplicity. Respective IDX register may store a memory page entry but instead of a physical address, an IPA-to-PA shift, as discussed above is stored. Such a modified memory page entry may be called a translation descriptor, to be compared with a page descriptor that is another name for memory page entry and will be used in the following. As already mentioned, the shift corresponds to the difference between the IPA and corresponding PA address. For the remainder of the translation descriptor, such as access rights, the register may store the same data as a page descriptor. The first cache memory 304 may include an additional field for storing a IDX value if relevant.

Examples will now follow of what may be performed by the MMU 300 when it shall retrieve a PA descriptor.

If a request for retrieval of the PA descriptor does not come with an IDX value, the MMU 300 may:
1. Read the corresponding PA descriptor.
2. If there is an available IDX register:
   a. Store the corresponding translation descriptor in the register and enable the IDX register to indicate it is not available by setting a flag, such as a bit, associated with the register.
3. Return the PA descriptor together with the IDX value to the first stage, such as a pre-fetch mechanism, which stores the IDX value together with the IPA descriptor in the first cache memory 304.
4. If there is no IDX register available, the following steps may be executed. Note that these steps may be executed if there is no available register after the available IDX register was used the previous steps 1-3, or before executing the previous steps 1-3 to help ensure there will be an available IDX register.
   a. Choose the IDX that corresponds to the oldest register, i.e. one that was in use or filled longest ago.
   b. Erase the corresponding IDX value from the VA-to-IPA translations, in the form of page descriptors, stored together with the IDX value in question in the first stage cache memory 304.
   c. Make the IDX register available by "disabling" it to indicate that it is available. This may include erasing the IDX register, but it may suffice that previous content may be overwritten. Similar as above, making the IDX register available may involve setting a flag, such as a bit.

If a request for retrieval of the PA descriptor comes with an IDX value and a flag mentioning this the request relates to pre-fetch, the MMU 300 may:
1. Read the corresponding PA descriptor.
2. Compute the corresponding translation descriptor.
3. If the translation descriptor is equal to one already stored in an IDX register:
   a. Return the PA descriptor together with the IDX value to the first stage, such as a pre-fetch mechanism, which stores the IDX value together with the IPA descriptor in the first cache memory 304.
4. If the translation descriptor is not equal to the one already stored in an IDX register, the MMU 300 may proceed with 2. of the previous description.

Examples regarding an overall "VA to PA" behavior when the MMU 300 may find a PA for a VA include:
1. If there is an IPA entry (for the VA) already stored in the first cache memory 304;
2. If the IPA entry it is stored together with an IDX, the MMU 300 retrieves the shift in the IDX register to deduce the corresponding PA and typically also access rights;
3. If the IPA entry is not stored together with an IDX, then the MMU 300 requests the PA descriptor in a conventional manner (without an IDX) from the 2nd-stage, thereby getting the PA descriptor and an IDX value, and may then perform pre-fetches with this IDX value;
4. If there is no IPA entry (for the VA) stored in the first cache memory 304, the MMU 300 may request the PA descriptor in a conventional manner (without an IDX)

from the 2nd-stage, thereby get the PA descriptor and an IDX value, and may then perform pre-fetches with this IDX value; and 5. To perform the actions 401-404 and/or actions 701-712 above for managing address translations, the MMU 300 may include an arrangement schematically depicted in FIG. 10.

The MMU 300 may include obtainment circuitry 1010 that in some embodiments is configured to obtain the first IPA based on the first VA relating to the first memory access request.

The MMU 300 may also include identification circuitry 1020 that in some embodiments is configured to identify, based on the first IPA, the first memory page entry in the second address translation table 306.

Moreover, the MMU 300 may include storage circuitry 1030 that in some embodiments is configured to store, in the second cache memory 308, the first IPA-to-PA translation based on the identified first memory page entry. The storage circuitry 1030 may be further configured to store, in the second cache memory 308 and in response to the identification of the first memory page entry, the one or more additional IPA-to-PA translations that are based on the corresponding one or more additional memory page entries in the second address translation table 306, with the one or more additional memory page entries being contiguous to the first memory page entry.

In some embodiments, where the second address translation table 306 utilizes at least two sizes of memory pages, such as a smaller and a larger size, the storage circuitry 1030 may be configured to store the first IPA-to-PA address translation and the one or more additional address translations in the second cache memory 308 in response to identification that they are of the larger size.

Furthermore, in some embodiments the MMU 300 may include determination circuitry 1040, which will be further described below.

In some embodiments, the obtainment circuitry 1010, may be configured to obtain the second IPA associated with the second VA-to-IPA translation. In addition, the identification circuitry 1020 may be configured to identify, based on the second IPA, the second IPA-to-PA translation in the second memory cache 308 or in the second address translation table 306. Also, the determination circuitry 1040 may be configured to determine, based on the identified second IPA-to-PA translation, the second IPA-to-PA shift. The storage circuitry 1030 may be configured to store the second IPA-to-PA shift in the register, such as the kth register 610, associated with the second cache memory 308.

The storage circuitry 1030 may be further configured to store, in the first cache memory 304, the second VA-to-IPA translation together with the register identifier identifying the register. In addition, the obtaining circuitry 1010 may be further configured to obtain the second VA relating to the second memory access request. Moreover, the identification circuitry 1020 may be further configured to, if the second VA is associated with the second VA-to-IPA translation in the first cache memory 304, identify the register based on the register identifier stored together with the second VA-to-IPA translation, and thereby identify the second IPA-to-PA shift stored therein.

The determination circuitry 1040 may be further configured to determine, based on the identified second VA-to-IPA translation and the identified second IPA-to-PA shift, the second PA corresponding to the second VA. Furthermore, the obtainment circuitry 1010 may be further configured to obtain the third IPA associated with a third VA-to-IPA translation.

The identification circuitry 1020 may be further configured to identify, based on the third IPA, the third IPA-to-PA translation in the second memory cache 308 or in the second address translation table 306. The determination circuitry 1040 may be further configured to determine, based on the identified third IPA-to-PA translation, the third IPA-to-PA shift.

The storage circuitry 1030 may be further configured to, if the third IPA-to PA shift is the same as the second IPA-to-PA shift already stored in the register, store, in the first cache memory 304, the third VA-to-IPA translation together with the register identifier identifying the register.

Figure 10:
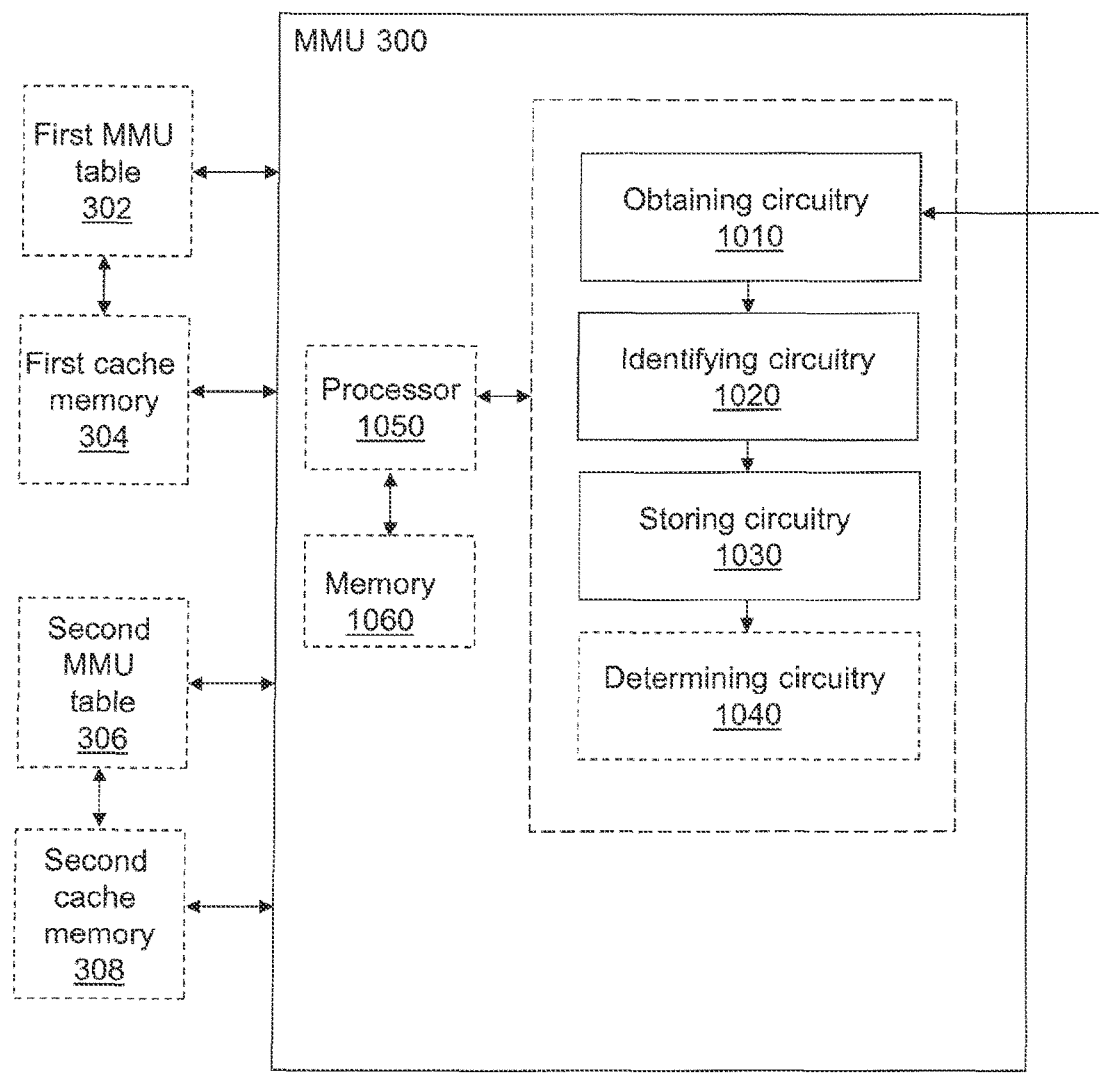
FIG. 10 is a schematic block diagram illustrating a MMU according to embodiments herein.

The embodiments of the MMU 300 may be fully or partly implemented through one or more processors, such as a processor 1050 in the MMU 300 depicted in FIG. 10, or the MMU being implemented as part of the processor 1050, together with computer program code executed by the processor 1050 for performing the functions and actions of embodiments herein. The circuitry discussed above may be fully or partially implemented by the processor 1050. Note that when the unit being served by the MMU 300 is a CPU, the CPU may be a separate processor from the processor 1050, which may be the case when the MMU is a separate physical unit. However, when the MMU 300 is integrated with and at least partly implemented by the processor 1050, the processor 1050 may correspond at least partly to the CPU being served by the MMU 300.

The computer program code mentioned above may also be provided as a computer program product, for instance in the form of a nontransitory data medium carrying computer program code for performing the embodiments herein when being loaded into the MMU 300. One such medium may be in the form of an optical disc, such as CD or DVD. It is however feasible with other data carriers such as a memory stick, memory card or hard drive. The computer program code may furthermore be provided as program code stored in a nontransitory storage medium of a server, and available for download to the MMU 300.

The computer program code may furthermore be provided in the form of a data file or files on, or available through, a nontransitory storage medium server for download. The file or files may be executable files for direct or indirect download to and execution on the MMU 300, or may be for intermediate download and compilation to make them executable before download to and for execution in the MMU 300. The server may be accessible over a computer network, such as the Internet, and may be a web or ftp server.

The MMU 300 may further comprise a memory 1060 having one or more memory units. The memory 1060 is arranged to store data, such as configurations and/or applications to perform the method when being executed in the MMU 300.

Those skilled in the art will also appreciate that the circuitry 1010-1040 may refer to a combination of analog and digital circuits, and/or one or more processors configured with software and/or firmware (stored in memory) that, when executed by the one or more processors such as the processor 1050, perform the methods as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Attention is again drawn to that the MMU 300 shown in the figures is simplified and schematic. Exactly how the shown parts relate to each other is dependent on practical implementation and architecture. For example, this may be dependent on whether the MMU 300 is a separate physical unit or integrated with the unit using it, such as a CPU, if there is one cache memory shared or separate cache memories, and where this or these are located in relation to the MMU 300 etc. The same applies for the physical location of the MMU tables, which however may be located in RAM or ROM, outside the MMU.

It should further be noted that embodiments herein may be applied to different kinds of two-stage MMUs, such as a system MMU (sMMU), a device MMU or IOMMU, whose purpose is to replicate CPU MMU to allow devices, such as master devices other than the CPU, such as a HW video decoder, to see the same memory map as the OS processes that are controlling them.

As used herein, the expression "configured to" may mean that a processing circuit is configured to, or adapted to, by software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. "Number", and "value" may also be represented by a bit string.

As used herein, the expression "in some embodiments" has been used to indicate that the features of the embodiment described may be combined with any other embodiment disclosed herein.

When using the word "comprise" or "comprising" it shall be interpreted as non-limiting.

Even though embodiments of the various aspects have been described, many different alterations, modifications and the like thereof will become apparent for those skilled in the art. The described embodiments are therefore not intended to limit the scope of the present disclosure.

The invention claimed is:

1. A method of managing address translations using a memory management unit, comprising:
    performing address translations between a virtual address space and an intermediate physical address space, using a processor and a first address translation table associated with a first cache memory, by obtaining a first intermediate physical address based on a first virtual address relating to a first memory access request; and
    performing address translations between the intermediate physical address space and a physical address space, using the processor and a second address translation table associated with a second cache memory, by:
        identifying, based on the first intermediate physical address, a first memory page entry in the second address translation table;
        storing, in the second cache memory, a first intermediate physical address to physical address translation based on the first memory page entry, wherein the first intermediate physical address to physical address translation shifts each intermediate physical address in the first memory page entry by a given shift amount; and
        storing, in the second cache memory, at least one additional intermediate to physical address translation based on a corresponding at least one additional memory page entry, the corresponding at least one additional memory page entry being contiguous with the first memory page entry in the second address translation table in the second cache memory, wherein the at least one additional intermediate to physical address translation shifts each intermediate physical address in the at least one additional memory page entry by the given shift amount.

2. The method of claim 1, wherein the first memory page entry has an intermediate physical to physical address shift; and wherein the at least one additional memory page entry is arranged so as to map intermediate physical addresses to physical addresses with a same intermediate physical address to physical address shift as the first memory page entry.

3. The method of claim 1, wherein the at least one additional memory page entry is associated with access rights corresponding to the first memory page entry.

4. The method of claim 1, wherein the second address translation table comprises a smaller memory page and a larger memory page; and wherein the first intermediate physical address to physical address translation and at least one additional address translation are stored in the second cache memory based upon the first intermediate physical address to physical address translation and the at least one additional address translation being associated with the larger memory page.

5. The method of claim 4, wherein the larger memory page of the second address translation table is larger than a memory page of the first address translation table.

6. The method of claim 1, wherein performing address translations between the virtual address space and the intermediate physical address space comprises obtaining a second intermediate physical address associated with a second virtual address to intermediate physical address translation; and wherein performing address translations between the intermediate physical address space and the physical address space comprises:
    identifying, based on the second intermediate physical address, a second intermediate physical address to physical address translation in at least one of the second memory cache and the second address translation table;
    determining, based on the second intermediate physical address to physical address translation, a second intermediate physical address to physical address shift;
    storing the second intermediate physical address to physical address shift in a register associated with the second cache memory; and
    storing, in the first cache memory, the second virtual address to intermediate physical address translation together with a register identifier identifying the register.

7. The method of claim 6, further comprising:
    obtaining a second virtual address relating to a second memory access request, and based upon the second virtual address being associated with the second virtual address to intermediate physical address translation in the first cache memory:
    identifying the register based on the register identifier to thereby identify the second intermediate physical address to physical address shift stored therein;
    determining, based on the second virtual address to intermediate physical address translation and the intermediate physical address to physical address shift, second physical address corresponding to the second virtual address.

8. The method of claim 6, further comprising:
obtaining a third intermediate physical address associated with a third virtual address to intermediate physical address translation;
identifying, based on the third intermediate physical address, a third intermediate physical address to physical address translation in at least one of the second memory cache and the second address translation table;
determining, based on the third intermediate physical address to physical address translation, a third intermediate physical address to physical address shift; and
based upon the third intermediate physical address to physical address shift correlating to the second intermediate physical address to physical address shift already stored in the register, storing, in the first cache memory, the third virtual address to intermediate physical address translation together with the register identifier.

9. The method of claim 1, wherein performing address translations between the virtual address space and the intermediate physical address space comprises using obtainment circuitry to obtain a first intermediate physical address based upon a first virtual address relating to a first memory access request; and wherein performing address translations between the intermediate physical address space and the physical address space comprises:
using identification circuitry to, based upon the first intermediate physical address, identify a first memory page entry in the second address translation table;
using storage circuitry to store, in the second cache memory, a first intermediate physical address to physical address translation based upon the first memory page entry;
using the storage circuitry to store, in the second cache memory and in response to the identification of the first memory page entry, at least one additional intermediate physical address to physical address translation based upon a corresponding at least one additional memory page entry in the second address translation table, with the at least one additional memory page entry being contiguous to the first memory page entry.

10. The method of claim 9, wherein the at least one additional memory page entry is arranged so as to map intermediate physical addresses to physical addresses with a same first intermediate physical address to physical address shift as the first memory page entry.

11. The method of claim 9, wherein the at least one additional memory page entry is associated with corresponding access rights to the first memory page entry.

12. The method of claim 9, wherein the second address translation table has a smaller memory page and a larger memory page; and wherein the first intermediate physical address to physical address translation and the at least one additional intermediate physical address to physical address translation is stored in the second cache memory based upon being associated with the larger memory page.

13. The method of claim 12, wherein the larger memory page is larger a memory page of the first address translation table.

14. The method of claim 1, wherein performing address translations between the virtual address space and the intermediate physical address space comprises using obtainment circuitry to obtain a second intermediate physical address associated with a second virtual address to intermediate physical address translation; and wherein performing address translations between the intermediate physical address space and the physical address space comprises:
using identification circuitry to identify, based on the second intermediate physical address, a second intermediate physical address to physical address translation in at least one of the second memory cache and the second address translation table;
using determination circuitry to determine, based on the second intermediate physical address to physical address translation, a second intermediate physical address to physical address shift;
using storage circuitry to store the second intermediate physical address to physical address shift in a register associated with the second cache memory; and
using the storage circuitry to store, in the first cache memory, the second virtual address to intermediate physical address translation together with a register identifier identifying the register.

15. The method of claim 14, further comprising:
using the obtainment circuitry to obtain a second virtual address relating to a second memory access request;
using the identification circuitry to, based upon the second virtual address being associated with the second virtual address to intermediate virtual address translation in the first cache memory, identify the register based on the register identifier, and thereby identify the second intermediate physical address to physical address shift stored therein;
using the determination circuitry to determine, based on the second virtual address to intermediate physical address translation and the second intermediate physical address to physical address shift, a second physical address corresponding to the second virtual address.

16. The method of claim 14, further comprising:
using the obtainment circuitry to obtain a third intermediate physical address associated with a third virtual address to intermediate physical address translation;
using the identification circuitry to identify, based on the third intermediate physical address, a third intermediate physical address to physical address translation in at least one of the second memory cache and the second address translation table;
using the determination circuitry to determine, based on the third intermediate physical address to physical address translation, a third intermediate physical address to physical address shift; and
using the storage circuitry to, based upon the third intermediate physical address to physical address shift being a same as the second intermediate physical address to physical address shift already stored in the register, store, in the first cache memory, the third virtual address to intermediate physical address translation together with the register identifier.

17. A method, comprising:
determining an intermediate physical address based on a virtual address, using a processor;
identifying, based on the intermediate physical address, a memory page entry in an address translation table, using the processor;
determining an intermediate physical address to physical address translation based on the memory page entry, using the processor, wherein the intermediate physical address to physical address translation shifts each intermediate physical address in the memory page entry by a given shift amount; and
determining, based upon the memory page entry, at least one additional intermediate physical to address translation based on a corresponding at least one additional memory page entry, the corresponding at least one additional memory page entry being contiguous with the memory page entry in the address translation table, using the processor, wherein the at least one additional intermediate to physical address translation shifts each intermediate physical address in the at least one additional memory page entry by the given shift amount.

18. The method of claim 17, wherein the at least one additional memory page entry is associated with access rights corresponding to the memory page entry.

19. An article, comprising:
   obtainment circuitry configured to obtain an intermediate physical address based upon a virtual address;
   identification circuitry configured to identify a memory page entry in an address translation table, based upon the intermediate physical address; and
   storage circuitry configured to store, in a cache memory, an intermediate physical address to physical address translation based upon the memory page entry, wherein the intermediate physical address to physical address translation shifts each intermediate physical address in the memory page entry by a given shift amount;
   wherein the storage circuitry is further configured to store, in the cache memory and in response to the identification of the memory page entry, at least one additional intermediate physical address to physical address translation based upon a corresponding at least one additional memory page entry in the address translation table, with the at least one additional memory page entry being contiguous to the memory page entry, wherein the at least one additional intermediate to physical address translation shifts each intermediate physical address in the at least one additional memory page entry by the given shift amount.

20. The article of claim 19, wherein the address translation table has a smaller memory page and a larger memory page; and wherein the intermediate physical address to physical address translation and the at least one additional intermediate physical address to physical address translation is stored in the cache memory based upon being associated with the larger memory page.

* * * * *